United States Patent [19]
Keller et al.

[11] 3,927,335
[45] Dec. 16, 1975

[54] MONOLITHIC INTEGRABLE SERIES STABILIZATION CIRCUIT

[75] Inventors: Hans Keller; Herbert Elmis, both of Gundelfingen, Germany

[73] Assignee: ITT Industries, Inc., New York, N.Y.

[22] Filed: June 27, 1974

[21] Appl. No.: 483,486

[30] Foreign Application Priority Data
Aug. 2, 1973   Germany............................ 2339150

[52] U.S. Cl. ................. 307/296; 307/254; 307/297
[51] Int. Cl.² ......................................... H03K 17/00
[58] Field of Search ...... 307/296, 297, 254; 323/22, 323/22 T, 4, 9, 17

[56] References Cited
UNITED STATES PATENTS

| | | | |
|---|---|---|---|
| 3,321,698 | 5/1967 | Merkel................................ | 307/297 |
| 3,714,512 | 1/1973 | Grabowski............................. | 323/9 |
| 3,714,543 | 1/1973 | Sahara et al. ........................... | 323/9 |
| 3,855,541 | 12/1974 | Leidich ............................. | 323/22 T |

*Primary Examiner*—John S. Heyman
*Assistant Examiner*—B. P. Davis
*Attorney, Agent, or Firm*—John T. O'Halloran; Menotti J. Lombardi, Jr.; Vincent Ingrassia

[57] ABSTRACT

A series stabilization circuit is provided which has a very low loss current when the load is switched off in battery driven devices. The invention proposes a circuit in which the loss current is dependent on the load current and on the difference between the unstabilized and the stabilized voltage. Therefore, loss currents in the order of 100 nA are available. The circuit is therefore applicable to watches and clocks.

4 Claims, 6 Drawing Figures

3,927,335

MONOLITHIC INTEGRABLE SERIES STABILIZATION CIRCUIT

BACKGROUND OF THE INVENTION

The present invention relates to battery-operated devices employing a series stabilization circuit, wherein a load is connected thereto which is only switched on temporarily. This kind of voltage supply is used, for example, in electronic clocks/watches, in receivers of staff locator (paging) systems, film cameras or warning devices.

Inasfar as these devices, if possible, require a constant supply voltage, they are operated from silver oxide or mercury batteries (cells), the voltage stability of which, however, is still insufficient for many practical applications. Further, these batteries (cells) are commercially available with similar designs but with different nominal voltages, so that the user may easily be mistaken by using an incorrect battery type for his device. For this reason there is a certain need for a series stabilization circuit supplying an output voltage which is independent of the battery voltage and which, itself, especially in the case of a non-loaded output, only has a negligibly small current consumption.

With respect to a series stabilization circuit for watches whose electromechanical transducer is operated by pulse currents of 1 mA, 10 ms duration and 1 Hz repetition frequency at an average current of 10 $\mu$A implies that the internal current consumption of the unloaded series stabilization circuit should be less than 1 $\mu$A.

This problem likewise arises in the case of film cameras where the photoconductive cell and the servomotor for setting the lens aperture in dependence upon the frame exposure, or an exposure-indicating instrument are only temporarily in operation, so that the series stabilization circuit must likewise have a very low internal current consumption during the non-operative periods.

In the case of staff locator (paging) system receivers, the receiving part is continuously switched on, but the optical or acoustical call signals are only transmitted, for example, by means of a blinker lamp or a buzzer upon receiving a corresponding incoming signal, so that during the call intervals the series stabilization circuit should likewise have a small internal current consumption.

SUMMARY OF THE INVENTION

It is the object of the invention to provide a monolithic integrable series stabilization circuit for generating a constant, stabilized output voltage in the order of 1V from a fluctuating input voltage, and in particular from the voltage of dry-cell batteries, for serving as the supply voltage of a temporarily switched-on load, whose shunt current, i.e., whose current consumption is to be smaller than 0.5 $\mu$A, when the load is switched off. This is achieved by supplying the regulating amplifier with current only when the load draws current from the regulated source of voltage thus, in a certain manner "blocking" it during the currentless periods. This causes a drastic reduction of the internal current consumption of the series stabilization circuit.

According to a broad aspect of the invention, there is provided a monolithic integrable series stabilization circuit for generating a constant stabilized output voltage in the order of one volt, from an unstabilized input voltage, particularly wherein the voltage of dry-cell batteries serve as the supply voltage of a temporarily connected load, in which the emitter of a series transistor is connected to an input terminal, and the collector thereof to an output terminal of the series stabilization circuit and wherein the base current of said series transistor is controlled by a regulating amplifier by comparing a portion of the stabilized output voltage as taken off an ohmic voltage divider with a reference voltage, wherein the improvement comprises: a first additional transistor of the same conductivity type as said series transistor having base, emitter and collector terminals, said base terminal coupled to the base of said series transistor and said collector terminal coupled to said regulating amplifier for supplying said regulating amplifier with current; a first resistor coupled between the emitter of said first additional transistor and the emitter of said series transistor; a second additional transistor having base, emitter and collector terminals, said base terminal coupled to the collector of said series transistor, and the collector of said second additional transistor coupled to said regulating amplifier; and the second resistor coupled between the emitter terminal of said second additional transistor and the emitter of said series transistor.

The above and other objects of the present invention will be better understood from the following detailed description taken in conjunction with the accompanying drawings, in which:

DESCRIPTION OF THE PREFERRED EMBODIMENTS

Figure 1:
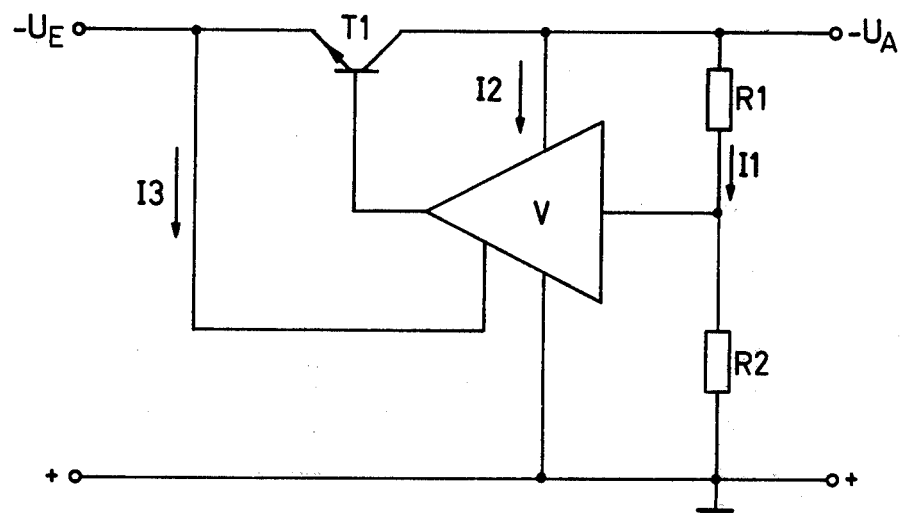
FIG. 1 shows schematically a conventional series stabilization circuit.

The series stabilization circuit according to the invention is based on the type of construction of usual or conventional series stabilization circuits, e.g. of the type as schematically shown in FIG. 1 of the accompanying drawings. The series transistor T1 shown in this drawing has an emitter coupled to the input terminal for the fluctuating input voltage $U_E$ and a collector coupled to the terminal for the stabilized output voltage $U_A$. The base of the series transistor T1 is controlled by comparing a portion of the stabilized output voltage as taken off the ohmic voltage divider R1, R2, with a reference voltage from the regulating amplifier V in the sense of keeping constant the output voltage $U_A$. The source of reference voltage is not shown particularly in FIG. 1, because it is mostly contained in the regulating amplifier V as the base-emitter threshold voltage of a transistor.

The internal current consumption of the series stabilization circuit which is unloaded at the output, is substantially composed of the current I1 flowing in the voltage divider R1, R2, and of the currents I2 and I3 flowing in the regulating amplifier. For keeping the current I1 as low as possible, the voltage dividing resistors R1 and R2 must be made as large as possible. When considering, however, that the input current of the regulating amplifier which is subject to tolerances, flows across one of the two resistors and, consequently, has an influence upon the voltage dividing ratio, the resistors, depending on the tolerance requirements placed on the stabilized output voltage, may not exceed a maximum value. Moreover, in an integrated circuit, high-ohmic resistors occupy very much of the crystal surface area. The value of the currents I2 and I3 is determined by the fact that the regulating amplifier of a loaded series stabilization circuit must supply sufficient base current for the series transistor T1. The minimum value thereof is restricted by the realizable current amplifications (gains) and resistance values.

Figure 2:
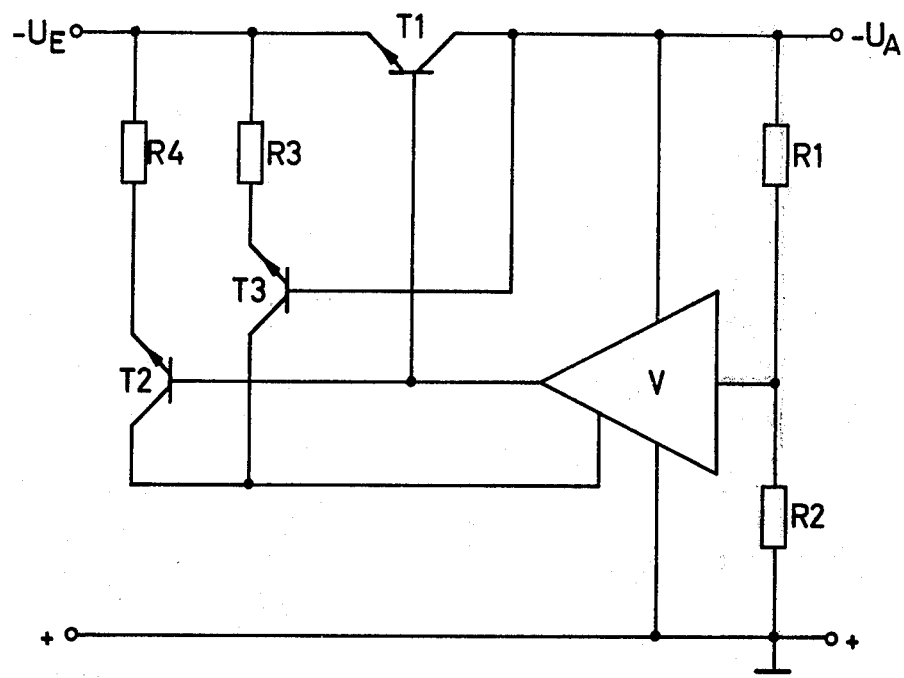
FIG. 2 shows a first example of embodiment of the invention.

In the embodiment according to FIG. 2 the base of the series transistor T1 is connected to the base of the first additional transistor T2 which is of the same conductivity type as the series transistor, with the emitter thereof being connected to the emitter of the series transistor across the resistor R4. Moreover, the base-emitter path of the second additional transistor T3 is connected in parallel with the collector-emitter path of the series transistor across the emitter resistor R3, with the second additional transistor likewise being of the same conductivity type as the series transistor T1, hence an npn-type transistor in the embodiment according to FIG. 2. The collectors of the two additional transistors T2, T3 are connected to one another and jointly supply the regulating amplifier V with current. In so doing, the first additional transistor T2 supplies the regulating amplifier with a current which increases as the current which flows in the load as connected to the output terminals increases, while the second additional transistor T3 supplies a current which increases as the difference between the input voltage $U_E$ and the output voltage $U_A$ increases. The shunt current flowing in the series stabilization circuit according to the invention is thus dependent upon the current requirement of the connected load.

Figure 3:
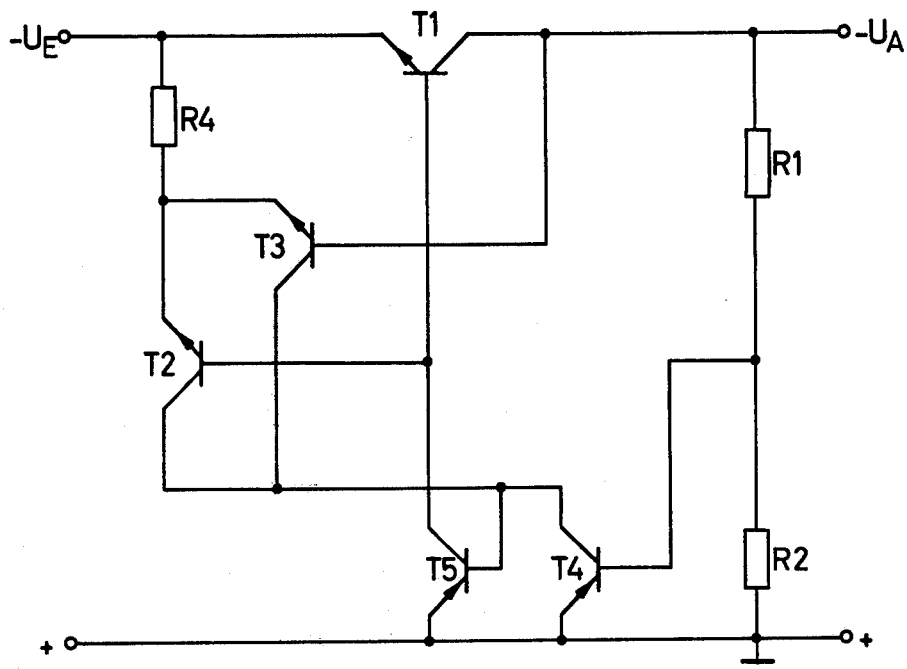
FIG. 3 shows the example of embodiment according to FIG. 2, employing a two-stage regulating amplifier.

Instead of connecting the emitter of the second additional transistor T3, across the resistor R3, to the emitter of the series transistor T1, the emitter of the second additional transistor T3 may also be connected directly to the emitter of the first addditional transistor T2, as is shown in the embodiment according to FIG. 3, or else may be connected to a tapping point of the resistor R4.

FIG. 3 shows the embodiment according to FIG. 2 employing a two-stage regulating amplifier. This regulating amplifier is composed of the transistors T4 and T5 which are complementary to that of the series transistor T1, hence pnp-type transistors in FIG. 3. The base of transistor T4 of the first stage is applied to the tapping point of the voltage divider composed of the voltage dividing resistors R1 and R2, while the base of transistor T5 of the second stage is galvanically (d.c.) connected to the collector of transistor T4. The two emitters are connected to the zero point of the circuit which is identical to the positive pole of the voltage to be stabilized. The emitter of the second additional transistor T3, as already mentioned hereinbefore, is applied to the emitter of the first additional transistor T2 and, accordingly, across the resistor R4, to the emitter of the series transistor T1.

Figure 4:
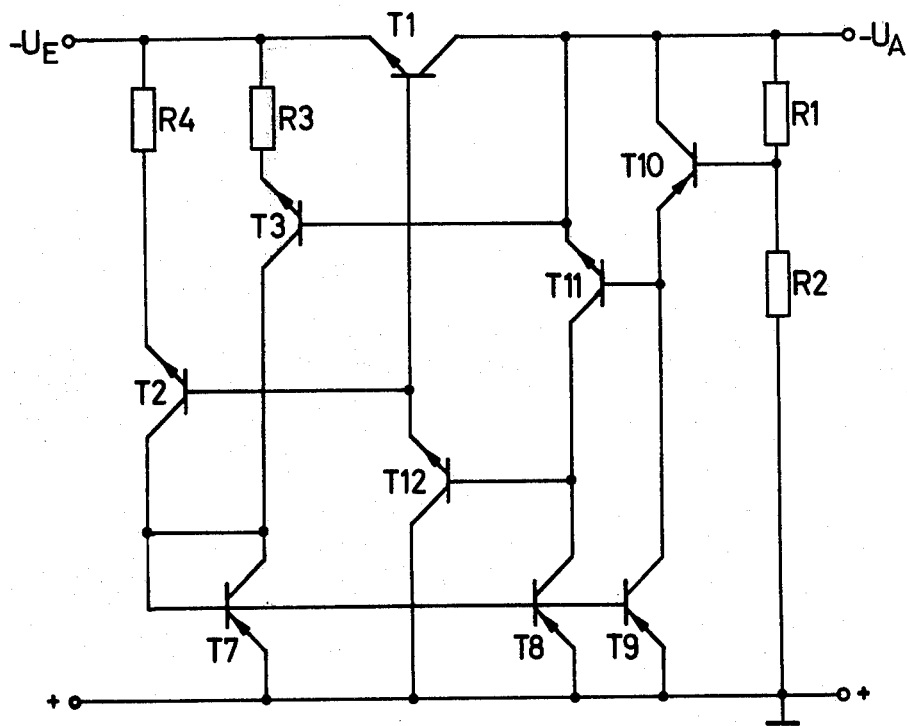
FIG. 4 shows a further development of the embodiment shown in FIG. 3.

FIG. 4 shows the embodiment according to FIG. 2 likewise employing a two-stage regulating amplifier, and providing for the supply of this regulating amplifier by the two additional transistors T2 and T3 via a current mirror circuit. The term "current mirror circuit" represents the well-known circuit for generating currents which are equal or in proportion to one another in which the collector current of a transistor whose base is connected to the collector, is determinative of the collector current of further associated transistors, with the base-emitter path thereof being connected in parallel with the base-emitter path of the first-mentioned transistor. In monolithic integrated circuits this leads to a multi-collector transistor of the type known to be used as constant current sources for replacing high-ohmic resistors. These are discussed in "IEEE Journal of Solid-State Circuits," April 1972, pp. 105 to 111, especially FIGS. 8 and 9 on page 107.

In the embodiment according to FIG. 4 the current mirror circuit comprises the transistors T7, T8 and T9 which are of a conductivity type complementary to that of the series transistor T1. The base of transistor T7 is connected to the collector thereof and applied to the two collectors of transistors T2 and T3. The current flowing in this transistor via the emitter-collector path thereof, owing to the current-mirror property of this circuit and probably even with a proportionality factor, likewise appears in the collector circuit of transistors T8 and T9 which have their base-emitter paths connected in parallel with the base-emitter path of transistor T7.

The regulating amplifier in the embodiment according to FIG. 4 comprises the transistors T11 and T12 which are both of the same conductivity type as the series transistor T1, and is thus of the two-stage type. The first stage with the transistor T11 is controlled at the base thereof via the emitter follower transistor T10 at the tapping point of the voltage divider R1, R2, with transistor T10 being of the same conductivity type as the transistors of the current image circuit.

The emitter of transistor T11 of the first regulating amplifier stage is applied to the pole of the stabilized output voltage, just like the collector of the emitter follower transistor T10. The collector of transistor T12 of the second regulating amplifier stage is applied to the zero point of the circuit to which there are also connected the emitters of the transistors T7, T8, T9 of the current mirror circuit. The collector of transistor T11 controls the base of transistor T12, and the emitter of transistor T12 controls the base of the series transistor T1. The collector of transistor T8 supplies the base of transistor T12, and the collector of transistor T9 supplies the base of transistor T11 with a current determined by the two additional transistors T2 and T3. In the embodiment according to FIG. 4, the difference between the base-emitter threshold voltages of transistors T10 and T11 serves as the internal reference voltage for the regulating amplifier.

The mode of operation of the circuit shown in FIG. 4 is as follows: Supposing that a load is connected to the output terminals, and that this load is switched on. Upon switching on the input voltage $U_E$, the second additional transistor T3 is controlled by the difference between the stabilized (output) and the unstabilized (input) voltage, so that the corresponding occurring collector current is capable of controlling the transistor T7 of the current mirror circuit, thus unblocking the transistors T8, T9 and T12. The base of the series transistor T1 is now unblocked by the emitter current of transistor T12 thus permitting current to flow to the load. Due to the increased voltage drop at the base-emitter path of the series transistor T1, the first additional transistor T2 is rendered conductive and supplies an additional current to the current mirror circuit which, in turn, causes the regulating amplifier to supply an increased base current to the series transistor T1. Depending on the magnitude of the current flowing in the load, the transistor T2 serves to control the current supplied to the regulating amplifier while the magnitude of the current supplied by the additional transistor T3 to the regulating amplifier is dependent upon the difference between the input and the output, i.e. the unstabilized and the stabilized voltage.

It may also happen that this difference is smaller than the base-emitter threshold voltage of the second additional transistor T3, so that the latter will no longer provide any supply current. This, however, is not disadvantageous because the additional transistor T3 will in any case always perform its function at the moment of switching-on.

Figure 5:
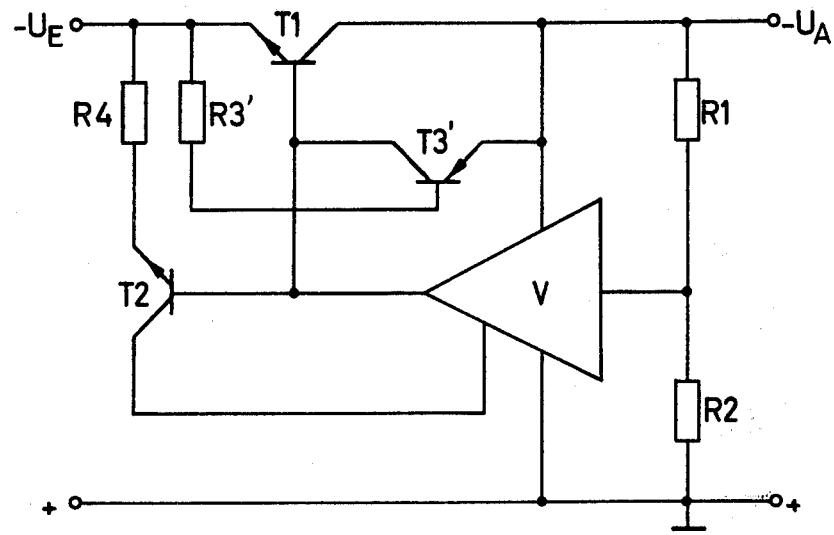
FIG. 5 shows a second embodiment of the invention.

FIG. 5 shows the principle underlying a second embodiment of the invention, in which the second additional transistor is a transistor T3' which is complementary to the type of conductivity of the series transistor T1, with the collector thereof being applied to the base of the series transistor, and with the base thereof being connected across the base resistor R3', to the emitter of the series transistor, and with the emitter thereof supplying the regulating amplifier V with current. The first additional transistor T2, however, is connected in the same way as in the first embodiment shown in FIGS. 2 to 4.

Figure 6:
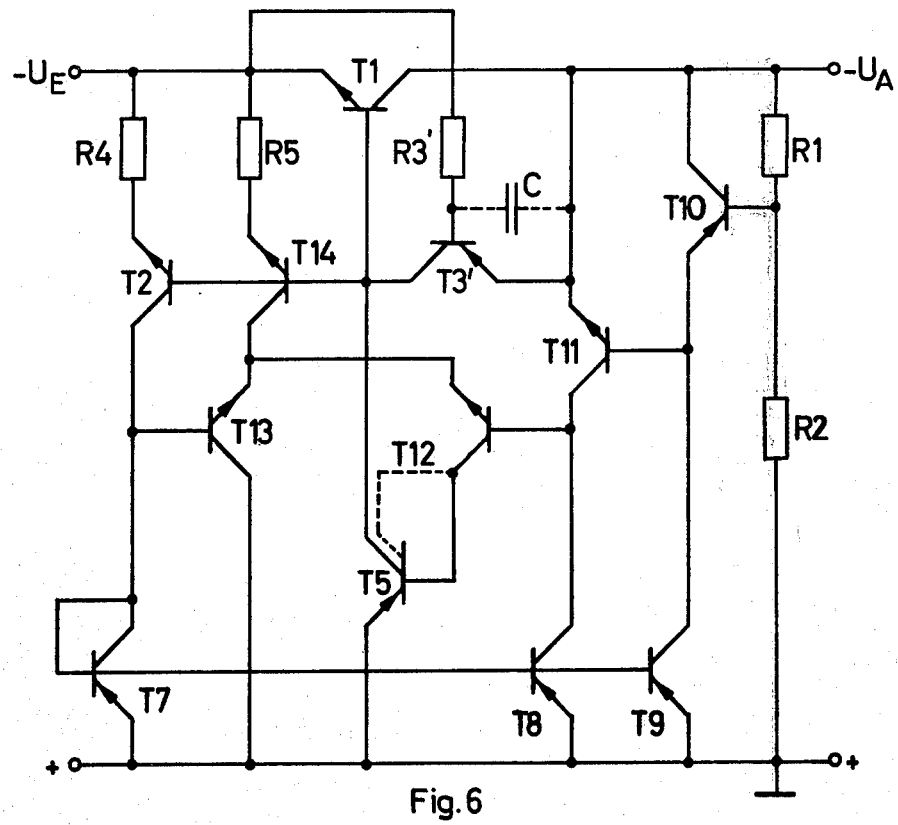
FIG. 6 shows the embodiment according to FIG. 5 employing a three-stage regulating amplifier.

FIG. 6 shows a series stabilization circuit designed in accordance with the principle of FIG. 5 and comprising a three-stage regulating amplifier V, in which the second stage consists of an asymmetrical differential amplifier and the regulating amplifier is again supplied by a current mirror circuit. The regulating amplifier itself consists of the first stage comprising the transistor T11, of the second stage comprising the asymmetrical differential amplifier of transistors T12, T13 and T14, and of the third stage comprising the transistor T5 whose conductivity type is complementary to that of the series transistor T1, while transistors T11, T12, T13, T14 are of the same conductivity type as the series transistor T1.

The base of transistor T11 is again controlled by the emitter follower transistor T10 as in FIG. 4. The collector of transistor T11 controls the base of transistor T12 whose emitter, together with the emitter of transistor T13, is controlled by the third additional transistor T14, with the collector-emitter path of this transistor extending from the two emitters, across the resistor R5, to the emitter of the series transistor T1. The base of the third additional transistor T14 is applied to the base of the series transistor T1, to the base of the first additional transistor T2, and to the collector of the second additional transistor T3'. The collector of transistor T13 is applied to the zero point of the circuit while the collector of transistor T12 controls the base of transistor T5 whose emitter is applied to the zero point of the circuit, and whose collector is applied to the base of the series transistor T1.

Accordingly, the differential amplifier as composed of the transistors T12 and T13 is an asymmetrical type of differential amplifier, because a signal is merely taken off in the one half thereof, and because also only this half is provided with a collector resistance (transistor T5).

The transistors T7, T8 and T9 of the current mirror circuit are connected in the same way as in the example of embodiment according to FIG. 4, i.e. the base of transistor T7 is connected to the collector thereof, the base-emitter paths of transistors T8 and T9 are connected in parallel with the base-emitter path of transistor T7, the collector of transistor T8 supplies the base of transistor T12, and the collector of transistor T9 supplies the base of transistor T11 with current. The second additional transistor T3', however, serves to directly supply the base of the series transistor T1 with current.

As has been proved by a circuit realized with reference to FIG. 6, it is desirable for reasons of suppressing oscillation tendency, that the transistor T5 has no excessively high current gain. For this reason, it may be appropriate to assign to this transistor a second collector connected to the base thereof, as is indicated by the dashline in FIG. 6. Moreover, it may be necessary for the capacitor C to be connected in parallel with the base-emitter path of the additional transistor T3' for the sake of suppressing the tendency towards oscillations, as is likewise indicated by the dashline in FIG. 6. Likewise, the voltage divider R1, R2 may be connected to the zero point of the circuit via a diode operated in the forward direction.

In further embodying the invention it is also possible to provide the additional transistors T2, T3, T3', T14 with at least one further collector, via which collector or via a current mirror circuit a stage of the regulating amplifier V other than the one supplied with current by the respective first collector, may be supplied with current directly. Likewise it is possible, for example, in the case of FIG. 3, to assemble the additional transistors T2 and T3 to form one single transistor having two collectors of which the one controls the regulating amplifier V directly, and of which the other one controls it via a current mirror circuit. This proposal of combining the additional transistors T2, T3 also refers to the circuit of FIG. 2.

On account of the principle underlying the invention, i.e. of effecting the controlled current supply dependent on the load current and on the difference between the unstabilized (input) and the stabilized (output) voltage, it is possible to realize series stabilization circuits having an extremely low loss current (internal current consumption) when the load is switched off, e.g. in the order of some 100 nA. Owing to this advantageous property of the series stabilization circuit according to the invention it is possible to accommodate it, in the case of monolithic integration, together with an inexpensive but not voltage-stabilized dry-cell battery in the same case or housing. This may result in further advantages insofar as the space otherwise provided for a larger-volume battery, may then be used for other purposes.

While the principles of the invention have been described above in connection with specific apparatus, it is to be clearly understood that this description is made only by way of example and not as a limitation on the scope of the invention.

What is claimed is:

1. A monolithic integrable series stabilization circuit for generating a constant stabilized output voltage in the order of one volt, from an unstabilized input voltage, particularly wherein the voltage of dry-cell batteries serve as the supply voltage of a temporarily connected load, in which the emitter of a series transistor is connected to an input terminal, and the collector thereof to an output terminal of the series stabilization circuit and wherein the base current of said series transistor is controlled by a regulating amplifier by comparing a portion of the stabilized output voltage as taken off an ohmic voltage divider with a reference voltage, wherein said regulating amplifier is a three-stage amplifier including first and second transistors forming an asymmetrical differential amplifier stage, a third transistor forming the first stage and a fourth transistor forming the third stage, wherein the improvement comprises:

a first additional transistor of the same conductivity type as said series transistor having base, emitter and collector terminals, said base terminal coupled to the base of said series transistor and said collector terminal coupled to said regulating amplifier for supplying said regulating amplifier with current;

a first resistor coupled between the emitter of said first additional transistor and the emitter of said series transistor;

a second additional transistor of a conductivity type opposite to that of said series transistor having base, emitter and collector terminals, said collector terminal coupled to the bases of said series transistor and said first additional transistor and said emitter terminal coupled to the collector of said series transistor and to said regulating amplifier;

a second resistor coupled between the base of said second additional transistor and the emitter of said series transistor;

an emitter-follower transistor having conductivity type complementary to that of said series transistor, said emitter-follower transistor having a base coupled to the tapping point of said voltage divider, a collector coupled to the collector of said series transistor, and an emitter coupled to the base of said third transistor; and a third additional transistor having a collector coupled to the emitters of said first and second transistor for supplying emitter current to said asymmetrical differential amplifier, said third additional transistor having a base coupled to the base of said series transistor and having an emitter coupled to the emitter of said series transistor, the base of said third transistor and the base of said first transistor supplied with current via a current mirror circuit.

2. A monolithic integrable series stabilization circuit according to claim 1 wherein said fourth transistor of said third stage of said regulating amplifier has a second collector terminal coupled to its base terminal.

3. A monolithic integrable series stabilization circuit according to claim 1 further comprising a capacitor coupled in parallel with the base emitter path of said second additional transistor.

4. A monolithic integrable series stabilization circuit according to claim 1 wherein at least one of said first, second, third or fourth additional transistors comprises at least one further collector terminal supplying a stage of said regulating amplifier other than the stage supplied by the first collector.

* * * * *